United States Patent
Jang

(10) Patent No.: US 12,112,903 B2
(45) Date of Patent: Oct. 8, 2024

(54) MECHANICAL KNOB APPARATUS CAPABLE OF PUSH AND ROTATION OPERATIONS

(71) Applicant: HYUNDAI MOBIS CO., LTD., Seoul (KR)

(72) Inventor: Kil Pyung Jang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/820,812

(22) Filed: Aug. 18, 2022

(65) Prior Publication Data

US 2023/0140066 A1 May 4, 2023

(51) Int. Cl.
*H01H 19/14* (2006.01)
*B60R 16/02* (2006.01)
*H01H 13/14* (2006.01)

(52) U.S. Cl.
CPC .............. *H01H 19/14* (2013.01); *B60R 16/02* (2013.01); *H01H 13/14* (2013.01); *H01H 2231/026* (2013.01)

(58) Field of Classification Search
CPC .. H01H 19/14; H01H 13/14; H01H 2231/026; H01H 25/06; H01H 25/065; B60R 16/02; G05G 5/06; G05G 1/02; G05G 1/08
See application file for complete search history.

(56) References Cited

U.S. PATENT DOCUMENTS

| 5,705,778 A | * | 1/1998 | Matsui | H01H 25/06 |
| | | | | 200/18 |
| 9,190,224 B2 | * | 11/2015 | Polak | H01H 3/12 |
| 11,186,176 B2 | * | 11/2021 | Erkocak | B60Q 3/10 |

FOREIGN PATENT DOCUMENTS

KR 2011-0000280 1/2011

OTHER PUBLICATIONS

English Language Abstract of KR 2011-0000280 published Jan. 3, 2011.

* cited by examiner

*Primary Examiner* — Lheiren Mae A Caroc
(74) *Attorney, Agent, or Firm* — DLA PIPER LLP (US)

(57) ABSTRACT

A mechanical knob which may be designed and tuned according to various design conditions (size and the like of the knob) without restriction conditions such as a size, height, and the like, its push and rotation operations may be performed, and many parts are unnecessary unlike the conventional mechanical knobs. The mechanical knob apparatus includes a dial configured to transmit a force at which a user rotates or presses the knob to perform the rotation or push rotation of the knob as an exterior part of the knob exposed to the outside, a push operation unit coupled to the dial through a radial bearing to perform the push operation, and a rotation operation unit coupled to the dial to perform both the push operation and the rotation operation.

19 Claims, 14 Drawing Sheets

MECHANICAL KNOB APPARATUS CAPABLE OF PUSH AND ROTATION OPERATIONS

CROSS-REFERENCE TO RELATED APPLICATION

This application claims priority to and the benefit of Korean Patent Application No. 10-2021-0150073, filed on Nov. 3, 2021, the disclosure of which is incorporated herein by reference in its entirety.

BACKGROUND

Field of the Invention

The present invention relates to a mechanical knob, and more specifically, to a mechanical knob apparatus having a structure capable of both a push operation and a rotation operation for adjusting functions of devices in a vehicle.

Discussion of Related Art

A tact switch is generally used for a push operation of a button. Since a lower portion of the button comes into contact with or is close to the tact switch, when the button is pressed, the tact switch is pressed to implement the push operation. In addition, encoders from conventional parts vendors (ALPS, PANASONIC, and the like) are often used to implement the rotation operation of the knob.

As described above, the tact switch may perform only the push operation of the button, and the encoder may perform only the rotation operation of the knob, thereby degrading the degree of freedom in design. In particular, in the encoder, it is difficult to tune the torque and detent (the number of rotations) of the knob, and the material cost is high.

In addition, there are mechanical knobs manufactured by designing mechanical structures according to specific demands. However, even in this case, the knob has a structure in which only a simple rotation operation is possible and requires many parts to implement the operation, and thus has disadvantages of more difficult assembly and a high price, and a problem that the operation feeling is changed by a deviation of the shape of a spring when a leaf spring is applied.

SUMMARY OF THE INVENTION

In recent vehicle interiors, conventional push buttons have been gradually disappearing, and all functions tend to be performed by a button of a knob. Accordingly, a push operation and a rotation operation should be implemented together in the knob for a vehicle. For example, operation knobs of air conditioners or audio/visual (AV) devices should perform functions such as power on/off and mode selection by the push operation, and perform functions such as temperature control, volume, and tuning by the rotation operation. However, the knob products supplied by conventional parts vendors may perform only the rotation or push operation, and the degree of freedom in design is degraded.

Accordingly, the present invention proposes a mechanical knob having a structure in which the knob may be designed and tuned according to various design conditions (size and the like of the knob) without restriction conditions such as a size, height, and the like of the knob, the push and rotation operations of the knob may be performed, and many parts are not required unlike the conventional mechanical knobs.

According to one aspect of the present invention, there is provided a mechanical knob apparatus capable of push and rotation operations, the mechanical knob apparatus including: a dial configured to transmit a force at which a user rotates or presses a knob to perform the rotation or push operation of the knob as an exterior part of the knob exposed to an outside; a push operation unit coupled to the dial through a radial bearing to perform the push operation; and a rotation operation unit coupled to the dial to perform both the push operation and the rotation operation.

In addition, according to another aspect of the present invention, there is provided a mechanical knob apparatus capable of push and rotation operations, the mechanical knob apparatus including: a printed circuit board (PCB) equipped with a tact switch and a photosensor; a dial configured to transmit a force at which a user rotates or presses a knob to perform the rotation or push operation of the knob as an exterior part of the knob exposed to an outside; a means coupled to the dial to push the tact switch assembled to the PCB; a detent housing having one end coupled to the dial, configured to accommodate a tact switch push unit therein, formed with an unevenness guide over a circumference of an inner diameter, and formed with a plurality of slits over a circumference of the other end to detect an amount of rotation of the dial in conjunction with the photosensor; a detent elastically coupled to the unevenness guide of the detent housing and configured to radially perform an elastic movement upon the rotation operation of the dial and the detent housing; and a knob housing coupled to the detent housing and configured to accommodate the detent therein.

Configurations and operations of the present invention will become clearer through specific embodiments described below together with the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving them will be made clear from exemplary embodiments described in detail below with reference to the accompanying drawings. However, the present invention is not limited to embodiments disclosed below but may be implemented in various different forms. Only these embodiments are provided so that the disclosure of the present invention will be thorough and complete and will fully convey the scope of the present invention to those skilled in the art to which the present invention pertains, and the present invention is defined by the description of the claims. In addition, the terms used in this specification are to describe embodiments and are not intended to limit the present invention. In this specification, the singular form also includes the plural form unless otherwise specified in the phrase. In addition, the terms 'comprise, comprising, and the like' as used in the specification are used as the meaning that does not preclude the presence or addition of one or more other components, steps, operations, and/or elements other than the stated components, steps, operations, and/or elements.

Hereinafter, exemplary embodiments of the present invention will be described in detail with reference to the accompanying drawings. In the description of embodiments, when a detailed description of a related known configuration or function may obscure the gist of the present invention, a detailed description thereof will be omitted.

Figure 1:
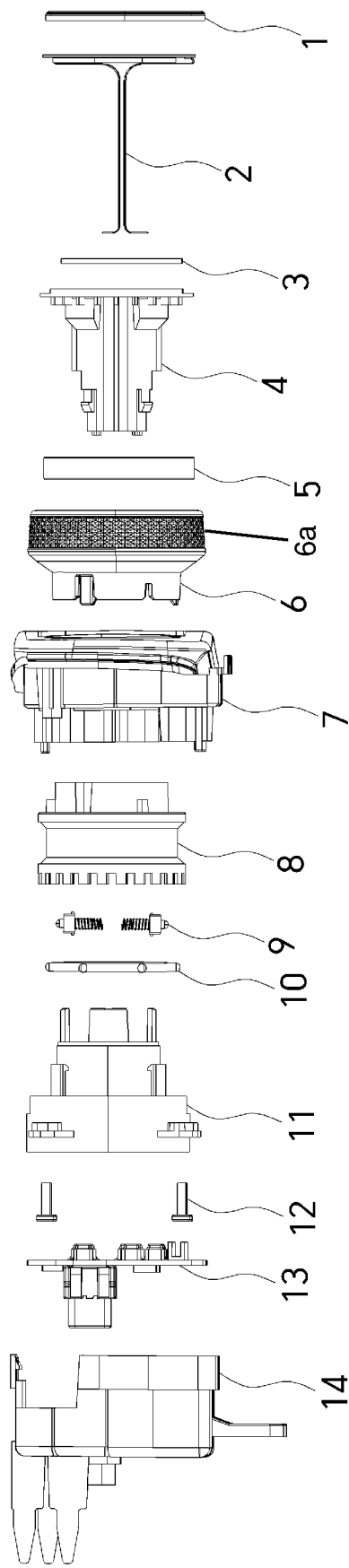
FIG. 1 is an exploded view of a mechanical knob apparatus according to an embodiment of the present invention.
Figure 2:
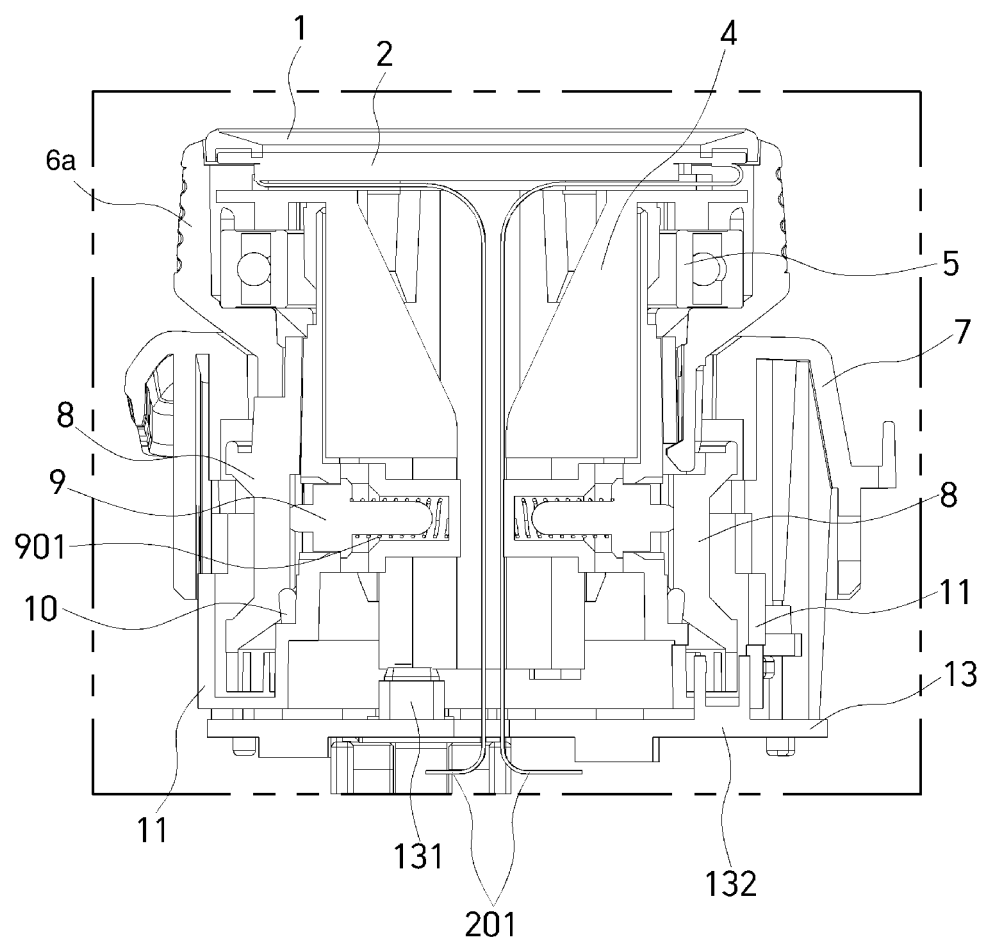
FIG. 2 is a cross-sectional view of an assembled state.
Figure 3:
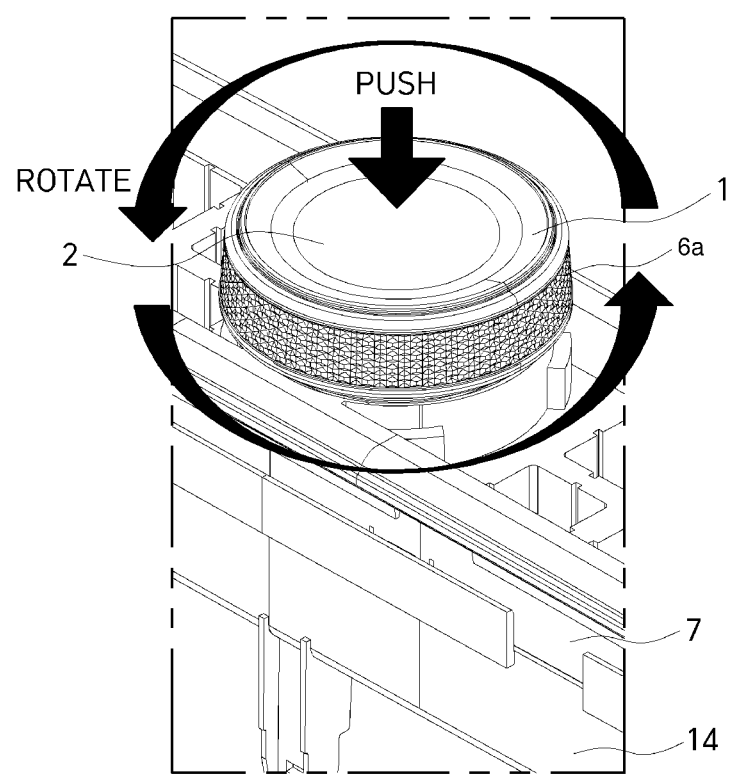
FIG. 3 is an exterior perspective view.

FIG. 1 is an exploded view of a mechanical knob apparatus according to an embodiment of the present invention. In addition, FIG. 2 is a cross-sectional view of an assembled state, and FIG. 3 is an exterior perspective view. Each component will be described with reference to FIGS. 1, 2 and 3.

Knob decoration 1: An exterior design part that functions to prevent foreign substances from being introduced into a gap between a knob 6 and a liquid crystal display (LCD) 2 and plays a role in improving exterior quality as a structure assembled to an upper portion of the LCD 2.

LCD 2: Displays necessary environmental information in a vehicle (vehicle temperature, sound volume, and the like) as a flat-panel display.

LCD housing 4: A part that functions to fix the LCD 2 using a double-sided foam tape 3 or the like, and comes into contact with a tact switch (not shown) assembled to a printed circuit board (PCB) 13 to push the tact switch. The LCD housing 4 has a hollow cylindrical shape having a partially empty inside so that an LCD cable (not shown) to be bonded to the PCB 13 may pass therethrough. The LCD housing 4 is coupled to a dial 6a to perform a push operation.

Dial 6a: An exterior part of the knob exposed to the outside, and a medium that transmits a force at which a driver (user) holds or presses the knob to perform the rotation or push operation of the knob while functioning as an indoor interior.

Detent housing 8: Engaged with a detent 9 by coupling one end (upper end in FIG. 1) of the cylindrical housing to the dial 6a and forming a plurality of floor/valley-shaped unevenness guides inside the other end (lower end in FIG. 1). In addition, a plurality of slits are formed at the other end over a circumference to detect the amount of rotation of the knob in conjunction with a photosensor. The detent housing 8 has a structure in which both a rotation operation according to the rotation of the dial 6a and a push operation according to the push of the LCD housing 4 and the dial 6a are possible. The detent housing 8 is positioned inside a front panel 7 and assembled with the dial 6a positioned outside.

Radial bearing 5: Assembled between the LCD housing 4 and the dial 6a in a method such as force-fitting or the like. The LCD housing 4 may perform only the push operation, and the detent housing 8 may perform both the push and rotation operations by the radial bearing 5.

Knob housing 11: One end is fixed to the PCB 13 and the other end is coupled to the detent housing 8, and the detent 9 engaged with the unevenness guide of the detent housing 8 is accommodated in the knob housing 11. The knob housing 11 is coupled to the detent housing 8 through a ball bearing 10 to rotate according to the rotation of the detent housing 8.

Detent 9 and spring 901: Assembled inside the knob housing 11, the detent 9 radially performs an elastic motion by the tension of the spring 901 upon the rotation operations of the dial 6a and the detent housing 8. The detent or the amount of rotation of the dial 6a corresponds to the number of clicks (contact and separation) between the unevenness guide of the detent housing 8 and the detent 9. In addition, the radial movement operation by the detent 9 and the elasticity of the spring 901 generates the operation feeling when the dial 6a is rotated.

PCB 13: A tact switch (131 in FIG. 2) for the push operation of the knob and a photosensor (132 in FIG. 2) for generating a detent detection signal upon the rotation operation of the knob are mounted on the PCB 13.

Front panel 7: An exterior part that is assembled to a dashboard or center fascia of a driver seat (not pictured) and exposed toward a driver (forward).

Screw 12: A fastening means for coupling the knob housing 11 to the front panel 7.

Back cover 14: A rear side exterior part of the entire structure of the knob apparatus.

Hereinafter, the entire structure and operation of the knob apparatus capable of the push and rotation operations according to an embodiment of the present invention will be described in detail.

Figure 4:
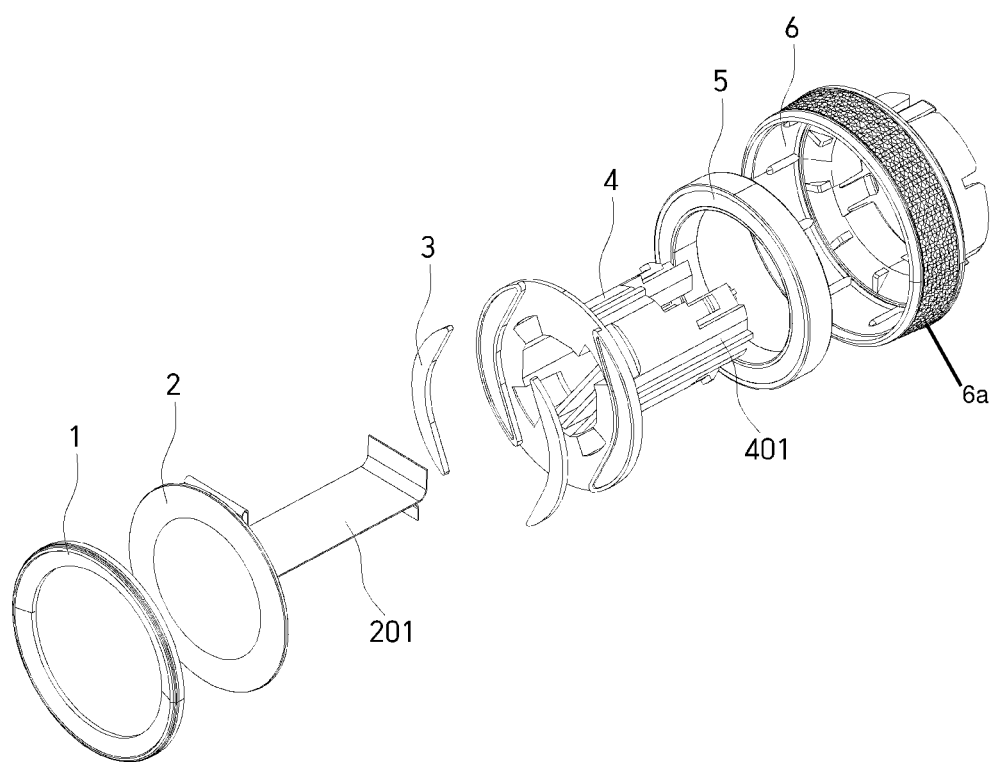
FIG. 4 is an exploded perspective view of components of a knob operation unit.

FIG. 4 is an exploded perspective view of a knob operation unit configuring an exterior of the knob apparatus among components shown in FIG. 1. The knob operation unit is a part exposed to the outside of the front panel 7. A structure of the knob operation unit will be described through an assembly method of the knob operation unit.

The knob decoration 1 and the LCD 2 may be coupled by force-fitting, or by a double-sided tape (not shown). The knob decoration 1 and the LCD 2 are portions exposed to the user (driver) and directly operated by the user.

The LCD 2 and the LCD housing 4 are assembled with the sponge-series double-sided foam tape 3 (the elasticity of the foam suppresses the occurrence of a screen distortion (such as 'Mura', blemish, etc.) occurring in the screen when the user pushes the LCD 2). The LCD housing 4 has a hollow cylindrical structure having an empty central portion, and a cable 201 of the LCD 2 passes through the hollow and then is bonded to the PCB 13. In addition, a terminal 401 of the LCD housing 4 is installed to come into contact with or be close to the tact switch 131 mounted on the PCB 13 to press the tact switch 13 when the user pushes the knob decoration 1 or the LCD 2.

Each of the LCD housing 4, the radial bearing 5, and the dial 6a is assembled by force-fitting. In other words, as shown in FIG. 4, an outer diameter of the LCD housing 4 is force-fitted into an inner diameter of the radial bearing 5, and an inner diameter of the dial 6a is force-fitted into an outer diameter of the radial bearing 5. Accordingly, since the LCD housing 4 and the dial 6a are axially fixed, when the LCD housing 4 is pushed, the dial 6a also performs the push operation accordingly (of course, the terminal 401 of the LCD housing presses the tact switch), but the rotation operation of the dial 6a is possible independently with respect to the LCD housing 4 in a circumferential direction.

FIGS. 5 to 8B show a rotation implementation unit of the knob apparatus. The rotation implementation unit is a portion that is positioned inside the front panel 7 and is not exposed to the outside. A structure of the knob rotation implementation unit will be described through the assembly method of the knob rotation implementation unit.

Figure 5:
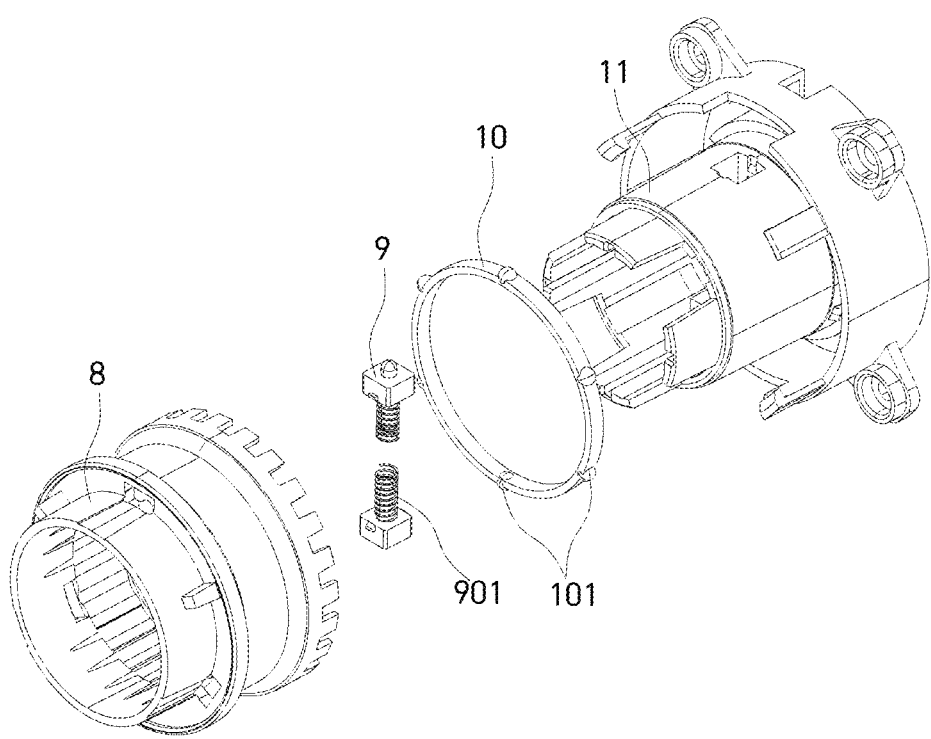
FIG. 5 is an exploded perspective view of components of a knob rotation implementation unit.

FIG. 5 shows components of the rotation implementation unit. The detent housing 8 is coupled to the knob housing 11 through the ball bearing 10, and a pair of detents 9 are coupled to the unevenness guide inside the detent housing 8, which will be described below. In addition, the ball bearing 10 is fitted into an outer diameter of the knob housing 11, and the pair of detents 9 are installed to protrude radially together with each spring 901 inside the knob housing 11. The ball bearing 10 has a form in which a plurality of balls 101 are rotatably embedded in a ring toward the detent housing 8.

Figure 6:
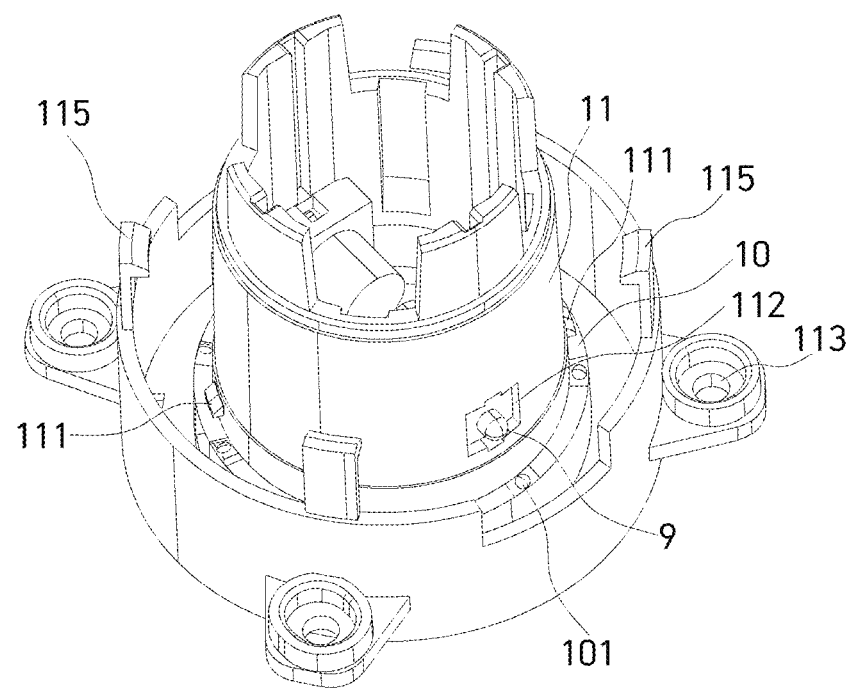
FIG. 6 is a top perspective view of a knob housing 11.

FIG. 6 shows that the ball bearing 10 is assembled on the outer diameter of the knob housing 11 and the pair of detents 9 are installed to protrude from the inside to the outside. The ring-shaped ball bearing 10 is fixed by two hooks 111 after being fitted onto the outer diameter of the knob housing 11. In addition, it can be seen that a tip of the detent 9 protrudes through an opening 112 formed in the outer diameter of the knob housing 11 (a coupling structure of the detent 9 and the spring 901 will be described below). A panel fastening unit 113 fixed to the front panel 7 by the screw (12 in FIG. 1) is formed in an outermost portion of the knob housing 11.

Figure 7A:
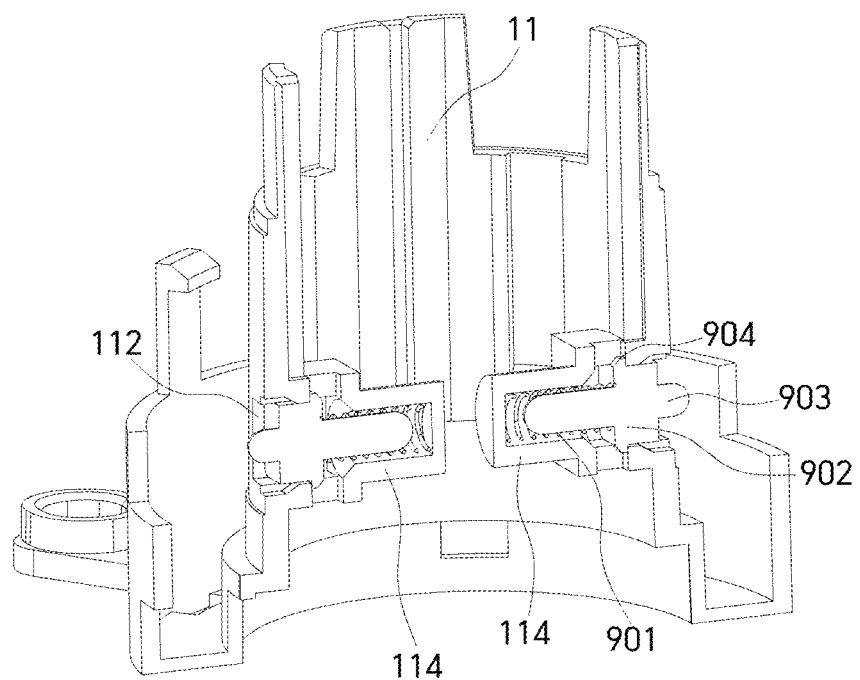
FIGS. 7A and 7B are partial cross-sectional views of the knob housing 11.
Figure 7B:
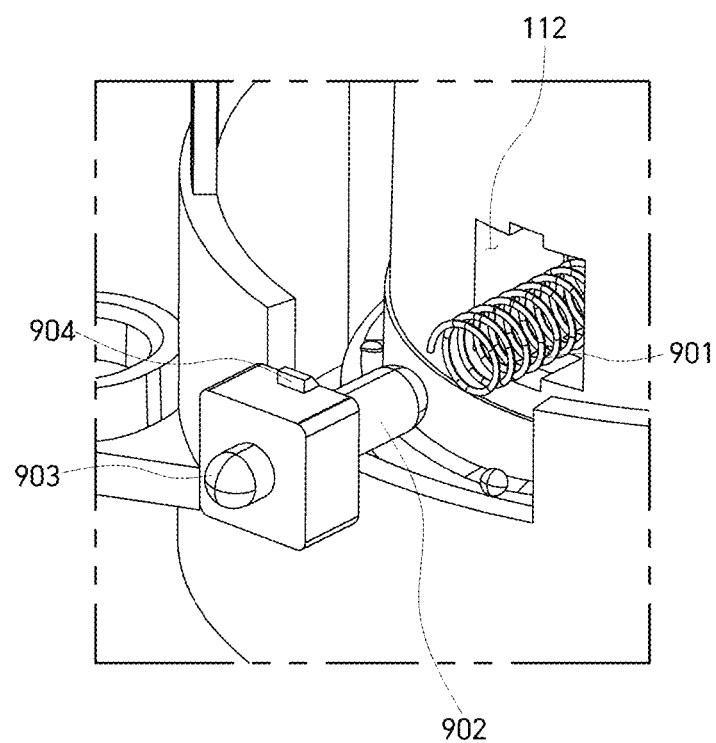

FIGS. 7A and 7B are cross-sectional views of a state in which the detent 9 is assembled to the knob housing 11. First, the detent 9 is inserted into the spring 901 and is composed of a body portion 902 positioned inside the knob housing 11, a tip portion 903 exposed to the outside of the outer diameter of the knob housing 11, and a locking projection 904 formed on the body portion 902 so as not to be separated to the outside of the outer diameter of the knob housing 11. In addition, a pocket 114 into which the body portion 902 of the detent 9 and the spring 901 enter is formed inside the knob housing 11, and the opening 112 allowing the tip portion 903 of the detent 9 to be exposed is formed in the outer diameter of the knob housing 11. With this structure, as shown in FIGS. 7A and 7B, the detent 9 is inserted into the pocket 114 of the knob housing 11 and the tip portion 903 is exposed to the outside of the opening 112. In order to prevent the body portion 902 of the detent 9 from being separated to the outside of the opening 112, the locking projection 904 is locked to a boundary surface of the opening 112 of the knob housing 11 (see FIG. 7B).

Figure 8A:
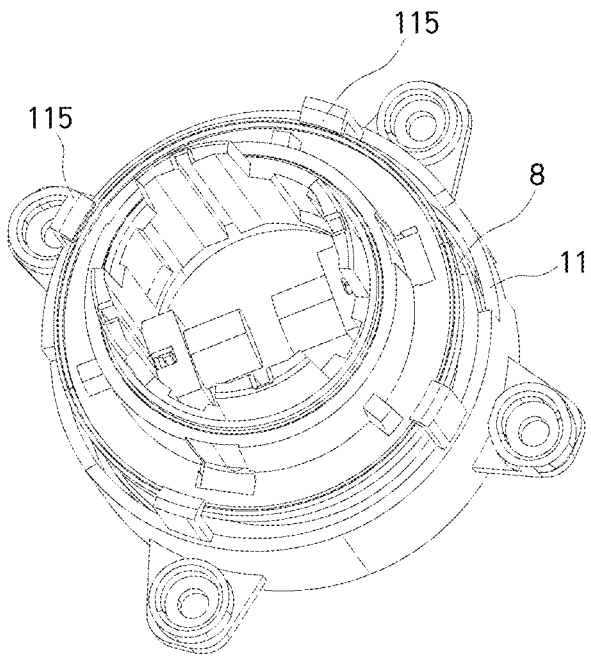
FIGS. 8A and 8B are perspective views showing that a detent housing 8 is assembled to the knob housing 11.
Figure 8B:
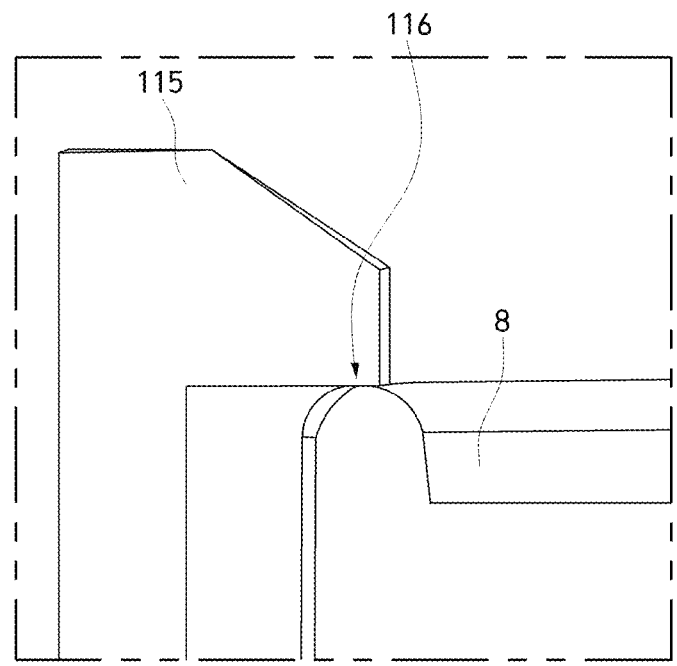

FIGS. 8A and 8B show that the detent housing 8 is assembled to the knob housing 11 in which the ball bearing 10 and the detent 9 are assembled as described above. The inner diameter of the detent housing 8 is fitted into and assembled to the outer diameter of the knob housing 11, and thus one end of the detent housing 8 may come into contact with the ball bearing 10 to rotate smoothly, and the tip portion 903 of the detent 9 is coupled to the unevenness guide (to be described below) formed inside the detent 9 to perform a click operation according to the rotation of the detent housing 8. When the detent housing 8 rotates in a click manner, light of the photosensor 132 of the PCB 13 may be blocked by/passed through a slit 802 (to be described below) of the detent housing 8 to detect the amount of rotation. As shown in FIG. 8A, after being inserted into the outer diameter of the knob housing 11, the detent housing 8 is fastened by four fixing hooks 115 formed at the outermost portion of the knob housing 11. The number and shape of the hooks 115 may be changed depending on the overall design, size, and the like of the knob apparatus. In addition, as shown in FIG. 8B, a contact portion 116 of the detent housing 8 and the fixing hook 115 of the knob housing 11 at least may come into point contact with each other so that the rotation operation can be smoothly performed in a state in which the detent housing 8 is fastened.

As described above, the panel fastening unit 113 of the knob housing 11 in which the ball bearing 10, the detent 9, and the detent housing 9 are assembled is fastened and assembled to the front panel 7 with the screw 12. In addition, as described earlier (see FIG. 2), the dial 6a is coupled to the detent housing 8 through the front panel 7.

Figure 9:
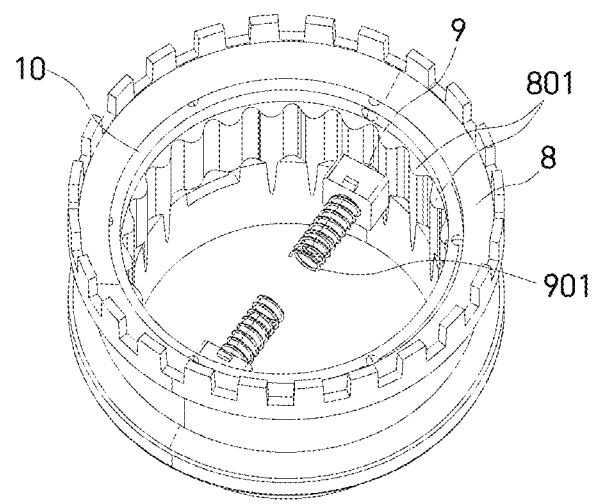
FIG. 9 is a perspective view of the detent housing 8 viewed from a bottom.
Figure 10:
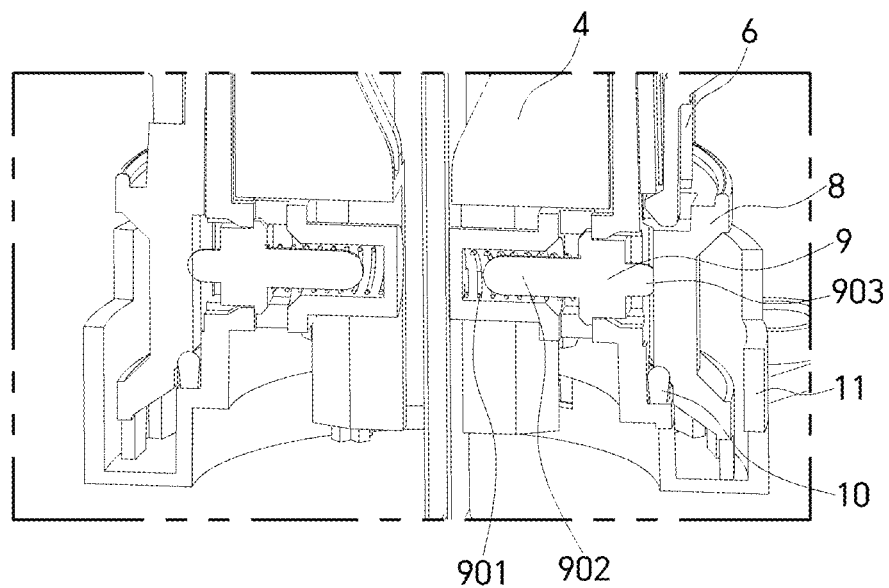
FIG. 10 is a longitudinal cross-sectional view showing a specific structure of a decent 9 installed in the knob housing 11.

FIGS. 9 and 10 are views for describing the detent count, rotation resistance, and operation feeling of the dial 6a (and the detent housing 8 accordingly). FIG. 9 is a view showing the detent housing 8 viewed from the bottom, that is, viewed from the right in FIG. 1, and shows a coupling relationship between the ball bearing 10 and the detent 9 fitted into the knob housing 11 (not shown). In addition, FIG. 10 is a longitudinal cross-sectional view showing a coupling structure of the detent 9 installed in the knob housing 11 and an unevenness guide 801 of the detent housing 8.

A plurality of unevenness guides 801 are formed on an inner surface of the detent housing 8. Concave and convex surfaces of the unevenness guide 801 are axially recessed and surfaces thereof are formed to be round, and as shown in FIGS. 7A and 7B, the tip portion 903 of the detent 9 is positioned to protrude radially at a 180° position with respect to the outer diameter of the knob housing 11, and thus, the tip portion 903 of the detent 9 performs the click operation by moving in and out of the unevenness guide 801 when the detent housing 8 is rotated. When the number of clicks is counted (e.g., when the number of times of light blocking of the photosensor by the slit of the detent housing 8 is used), the detent of the detent housing 8 may be known. Since the detent housing 8 rotates together with the dial 6a, when the user turns the dial 6a, the amount of rotation or detent of the dial 6a may be known by a reciprocal motion of the detent 9 with respect to the unevenness guide 801 (to this end, the photosensor 132 assembled to the PCB 13 may be used). A micro control unit (MCU) calculates a control amount corresponding to a degree to which the user turns the dial 6a by processing the detent.

In addition, since the click operation of the detent 9 is performed by the spring 901, an elastic force (tension) of the spring 901 with respect to the unevenness guide 801 directly generates the rotation resistance and operation feeling when the dial 6a rotates. The rotation resistance and the operation feeling of the dial 6a are adjustable according to changes in heights and widths of the floor/valley (concave surface/convex surface) of the unevenness guide 801 together with the spring 901, and the operation feeling can be tuned by appropriately adjusting these parameters according to a buyer's request to tune the operation feeling. Of course, the type (coil spring, leaf spring, or the like), material, number of turns, outer diameter, and the like of the spring 901 are also one of parameters necessary for adjusting the operation feeling.

In addition, in order to minimize a ghost flow (slightly idle feeling when clicking) upon operation of the dial, the shapes of the concave surface/convex surface of the unevenness guide 801 of the detent housing 8 and the shape of the tip portion 903 of the detent 9 should be matched one-to-one. In addition, in order to reduce a frictional force between the unevenness guide 801 and the tip portion 903 of the detent when the dial 6a is rotated, a contact area between a surface other than the concave surface of the unevenness guide 801 and the tip portion 903 of the detent may be as small as possible (ideally, point contact).

Figure 11A:
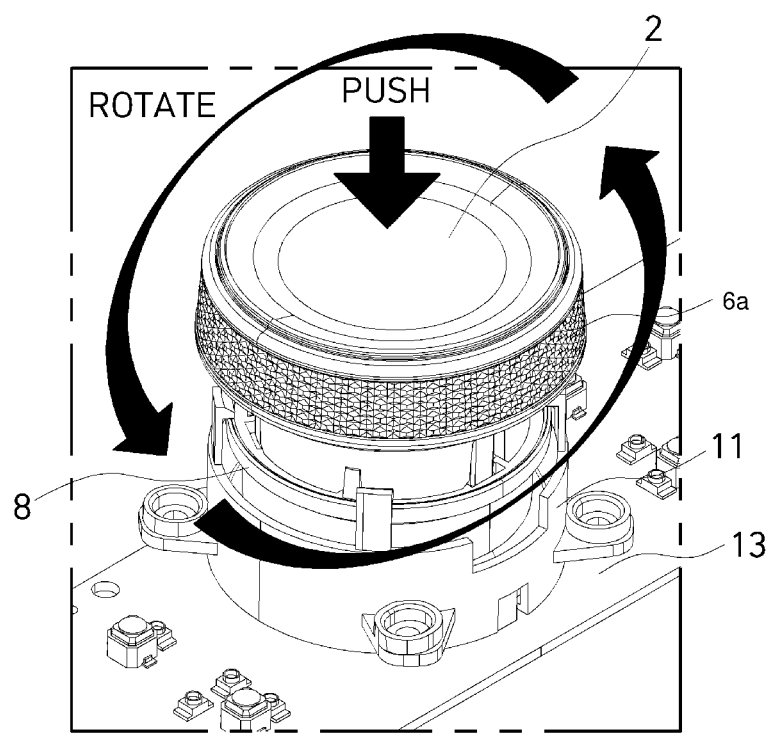
FIGS. 11A and 11B are each a perspective view and a longitudinal cross-sectional view for describing a structure for preventing knob wobble.
Figure 11B:
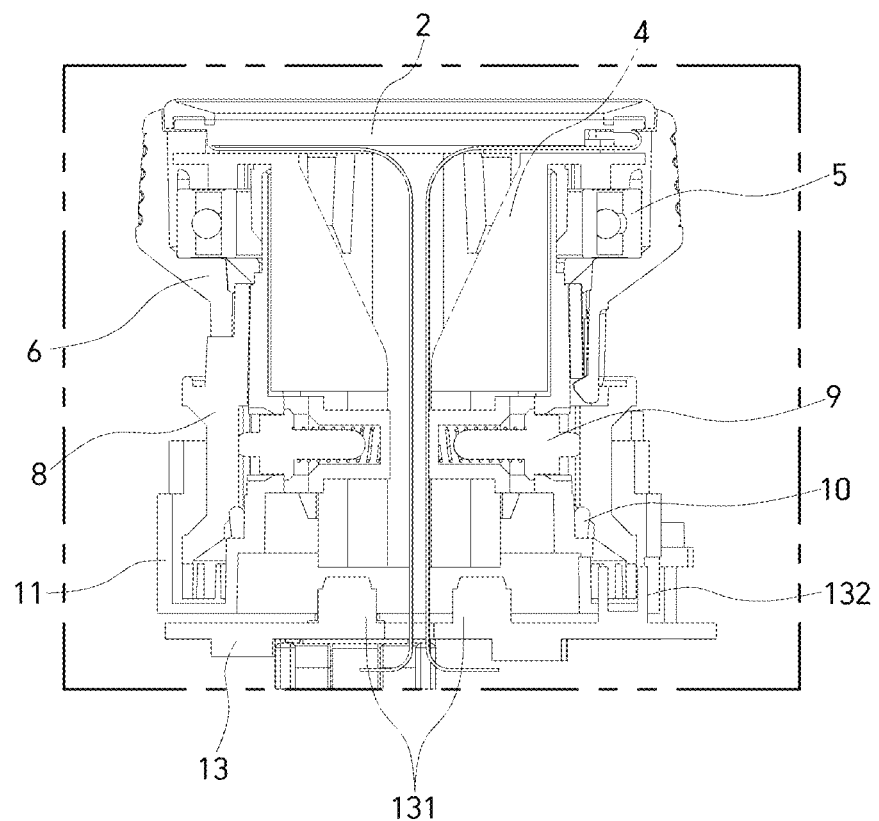

FIGS. 11A and 11B are a perspective view and a longitudinal cross-sectional view for describing a structure for preventing knob wobble.

The detent housing 8 is a rotating body, and coupled to the knob housing 11, which is a fixed body, through the ball bearing 10 therebetween. In addition, the dial 6a is a rotating body, and coupled to the LCD housing 4, which is a fixed body, through the radial bearing 5 therebetween. Accordingly, it comes into point contact with the ball bearing 10 and comes into surface contact with (is force-fitted into) the radial bearing 5. In addition, in terms of an overall structure, since the ball bearing 10 is positioned at the bottom of the knob structure and the radial bearing 5 is positioned at the top thereof, a wobble other than the torque by the rotation of the knob is prevented.

Figure 12:
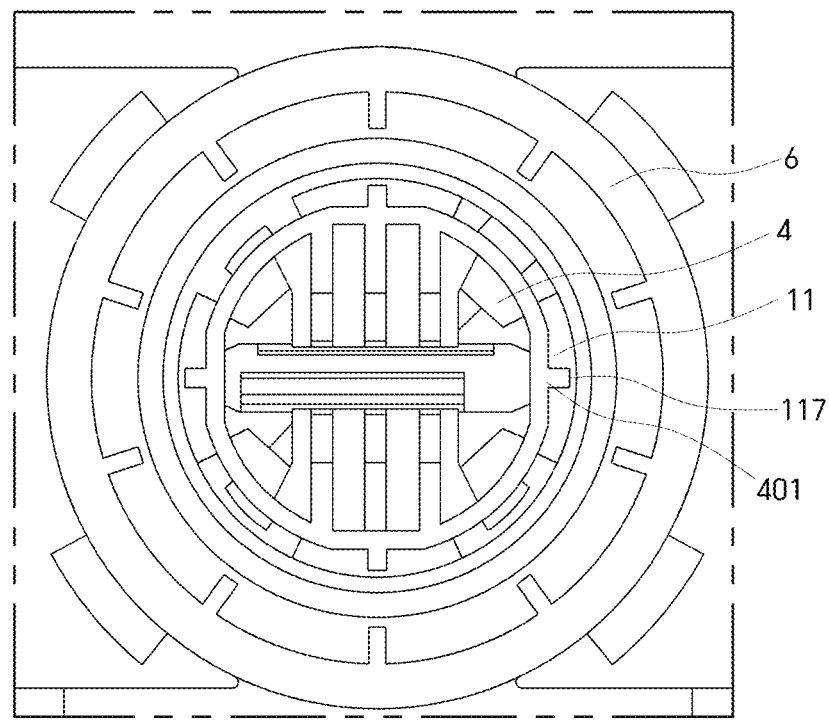
FIG. 12 is a cross-sectional view of an assembled knob apparatus laterally taken from a body portion of an LCD housing 4.
Figure 13:
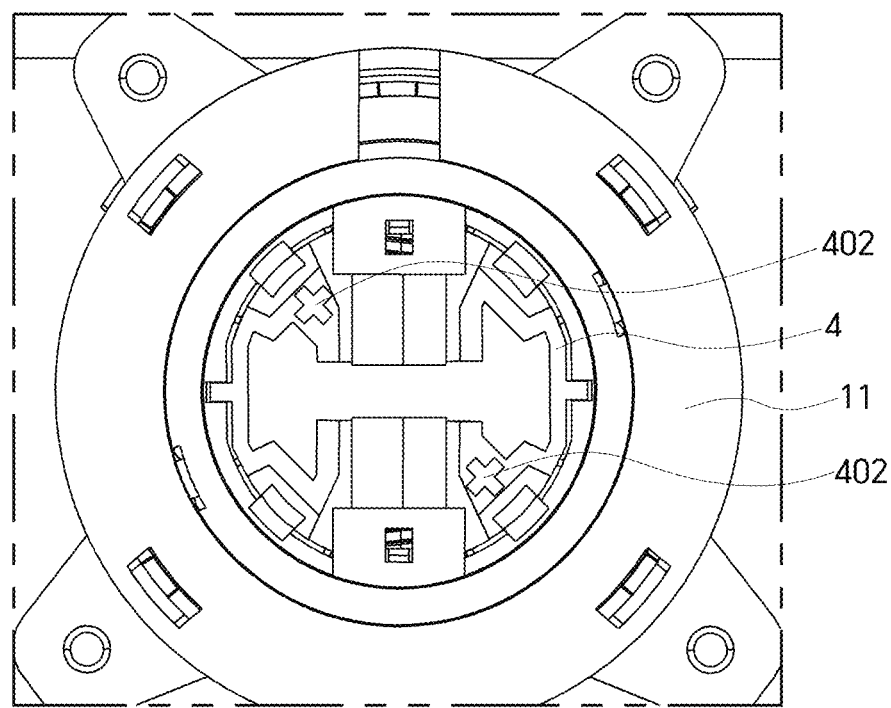
FIG. 13 is a cross-sectional view of a lowermost end of the LCD housing 4 laterally cut.

The push operation of the knob will be described with reference to FIGS. 12 and 13. FIG. 12 is a cross-sectional view of the assembled knob apparatus laterally taken from the body portion of the LCD housing 4, and FIG. 13 is a cross-sectional view of a lowermost end of the LCD housing 4.

As described above, since the dial 6a is in a state of being force-fitted into the LCD housing 4 via the radial bearing 5, and the LCD 2 and the LCD housing 4 are fixed by the double-sided foam tape 3, when either the dial 6a or the LCD 2 is pushed, the dial 6a, the LCD 2, and the LCD housing 4 axially move together (however, when the dial 6a is rotated, only the detent housing 8 rotates due to the characteristics of the radial bearing 5).

As a structure of ensuring the push operation, the LCD housing 4 and the knob housing 11 are formed with a slide structure for the push operation in the axial direction. Referring to FIG. 12, four guide protrusions 401 are axially formed long on the outer diameter of the LCD housing 4, and four rails 117 are axially formed long on the inner diameter of the knob housing 11 coupled to the LCD housing 4 and coupled to the guide protrusions 401. Accordingly, the LCD housing 4 is prevented from being separated upon the push operation with respect to the knob housing 11 and smoothly operated.

In addition, a cross rib 402 positioned at the lowermost end of the LCD housing 4 and pressing the tact switch 131 mounted on the PCB 13 will be described with reference to FIG. 13. In other words, when the LCD 2 or the dial 6a of the knob apparatus is pressed, the cross rib 402 at the lowermost end of the LCD housing 4 operates the tact switch 131 of the PCB 13 as the LCD housing 4 is pushed. Accordingly, the MCU executes functions (e.g., power on/off, mode selection, and the like) given to the corresponding tact switch.

Figure 14:
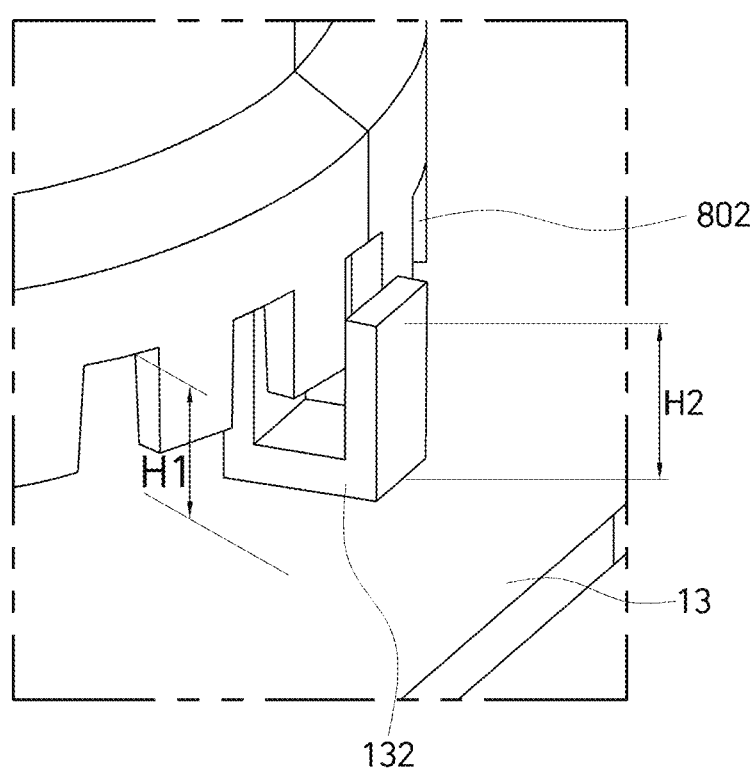
FIG. 14 is a view for describing a structure of implementing in which a detent count upon rotation operation of the knob apparatus.

FIG. 14 is a view for describing a structure of implementing the detent count upon the rotation operation of the knob apparatus. A plurality of slits 802 are formed in the lower portion of the detent housing 8, that is, a portion coming into contact with the PCB 13 in the circumferential direction. The slits 802 are configured to pass between a light emitting portion and a light receiving portion of the photosensor 132 to allow light to pass or block between the light emitting portion and the light receiving portion of the photosensor 132 when the detent housing 8 is rotated. It is possible to recognize the detent or the amount of rotation of the knob apparatus by counting the number of passing and blocking of this light, and execute a function coded as a program correspondingly.

Meanwhile, in order to prevent the push operation of the knob apparatus from affecting the detent count, a distance ('H1' shown in FIG. 14) from the PCB 13 to a cut position of the slit 802 of the detent housing 8 should be set greater than a distance H2 from the PCB 13 to a position of a light beam of the photosensor 132. This is because the slit 802 does not affect the operation of blocking or passing light of the photosensor 132 even when the detent housing 8 moves down by the push operation of the knob apparatus.

According to the present invention, it is possible to perform rotation and push operations of a knob itself, improve a torque of the knob, and improve performance because a difference in an operation feeling of the knob due to a deviation between parts does not occur when the knob is mass produced. In addition, it is possible to reduce costs (reduce a mold cost and a material cost) when compared to asking conventional encoder vendors to develop new knobs and improve the degree of freedom in design. Since the requirements for design and operating conditions of the knob, the operation feeling of the knob, and the like are different for each customer in the field, the structure of the knob according to the present invention can quickly and easily respond to these requirements.

Until now, although the present invention has been described in detail through the exemplary embodiments of the present invention, those skilled in the art to which the present invention pertains will understand that the present invention may be embodied in specific forms different from the contents disclosed in this specification without changing the technical spirit or essential features of the present invention.

As described above, it should be understood that the above-described embodiments are illustrative and not restrictive in all respects. In addition, the scope of the present invention is defined by the claims to be described below rather than the above detailed description, and all changed or modified forms derived from the claims and their equivalent concepts should be interpreted as being included in the technical scope of the present invention.

What is claimed is:

1. A mechanical knob apparatus capable of push and rotation operations, the mechanical knob apparatus comprising:
   a dial configured to transmit a force at which a user rotates or presses a knob to perform the rotation or push operation of the knob as an exterior part of the knob;
   a push operation unit coupled to the dial through a radial bearing to perform the push operation; and
   a rotation operation unit coupled to the dial to perform both the push operation and the rotation operation, wherein the rotation operation unit includes:
   a detent housing having one end coupled to the dial, and being configured to accommodate the push operation unit, and being formed with an unevenness guide over a circumference of an inner diameter and with a plurality of slits over a circumference of another end to detect an amount of rotation of the dial in conjunction with a photosensor; and a detent elastically coupled to the unevenness guide of the detent housing and configured to radially perform an elastic movement upon the rotation operation of the dial and the detent housing.

2. The mechanical knob apparatus of claim 1, wherein one end of the push operation unit is coupled to a liquid crystal display (LCD), and another end is an LCD housing having a terminal for operating a tact switch.

3. A mechanical knob apparatus capable of push and rotation operations, the mechanical knob apparatus comprising:

a printed circuit board (PCB) equipped with a tact switch and a photosensor;

a dial configured to transmit a force at which a user rotates or presses a knob to perform the rotation or push operation of the knob as an exterior part of the knob;

a tact switch push unit coupled to the dial to push the tact switch;

a detent housing having one end coupled to the dial, and being configured to accommodate a tact switch push unit therein, and being formed with an unevenness guide over a circumference of an inner diameter and with a plurality of slits over a circumference of another end to detect an amount of rotation of the dial in conjunction with the photosensor;

a detent elastically coupled to the unevenness guide of the detent housing and configured to radially perform an elastic movement upon the rotation operation of the dial and the detent housing; and a knob housing coupled to the detent housing and configured to accommodate the detent therein.

4. The mechanical knob apparatus of claim 3, wherein one end of the tact switch push unit is coupled to a liquid crystal display (LCD), and another end is an LCD housing having a terminal for operating the tact switch.

5. The mechanical knob apparatus of claim 4, further comprising a knob decoration attached to the LCD of the LCD housing.

6. The mechanical knob apparatus of claim 3, further comprising a radial bearing inserted between the tact switch push unit and the dial to allow the tact switch push unit to perform only the push operation, and the detent housing to perform both the push and rotation operations.

7. The mechanical knob apparatus of claim 3, further comprising a ball bearing positioned between the detent housing and the knob housing so that the detent housing rotates in a state of being coupled to the knob housing.

8. The mechanical knob apparatus of claim 3, further comprising a front panel positioned between the dial and the detent housing, and being adapted to be assembled to a dash board or a center fascia of a driver seat to be exposed to an interior of a vehicle.

9. The mechanical knob apparatus of claim 3, wherein a pair of detents coupled to the unevenness guide of the detent housing are provided, and the pair of detents are installed to radially protrude by an elastic force of a spring included in each detent.

10. The mechanical knob apparatus of claim 3, wherein the ball bearing includes a ring fitted into an outer diameter of the knob housing, and a plurality of balls attached to the ring rotatably toward the detent housing.

11. The mechanical knob apparatus of claim 3, wherein the detent includes a body portion inserted into a coil spring and positioned inside the knob housing, a tip portion exposed to outside of an outer diameter of the knob housing, and a locking projection formed on the body portion so as not to be separated from the outside of the outer diameter of the knob housing.

12. The mechanical knob apparatus of claim 11, wherein the knob housing includes a pocket formed therein for receiving the body portion of the detent and the coil spring, and an opening formed in an outer diameter so that the tip portion of the detent is exposed.

13. The mechanical knob apparatus of claim 12, wherein the detent further includes the locking projection configured to prevent the body portion from being separated from the outside of the opening when the tip portion is exposed to the outside of the opening after the body portion is inserted into the pocket of the knob housing.

14. The mechanical knob apparatus of claim 11, wherein shapes of a concave surface and a convex surface of the unevenness guide of the detent housing are the same as a shape of the tip portion of the detent.

15. The mechanical knob apparatus of claim 14, wherein a surface other than a concave surface of the unevenness guide of the detent housing and the tip portion of the detent come into point contact with each other.

16. The mechanical knob apparatus of claim 3, wherein the slits of the detent housing detects an amount of rotation by blocking or passing light of the photosensor mounted on the PCB.

17. The mechanical knob apparatus of claim 3, wherein a guide protrusion is axially formed on an outer diameter of the tact switch push unit, and a rail coupled to the guide protrusion is axially formed on an inner diameter of the knob housing.

18. The mechanical knob apparatus of claim 3, wherein a terminal of the tact switch push unit includes a cross rib configured to press the tact switch.

19. The mechanical knob apparatus of claim 3, wherein a distance from the PCB to a cut position of the slits of the detent housing is greater than a distance from the PCB to a position of a light beam of the photosensor.

* * * * *

UNITED STATES PATENT AND TRADEMARK OFFICE
CERTIFICATE OF CORRECTION

| | | |
|---|---|---|
| PATENT NO. | : 12,112,903 B2 | Page 1 of 1 |
| APPLICATION NO. | : 17/820812 | |
| DATED | : October 8, 2024 | |
| INVENTOR(S) | : Kil Pyung Jang | |

It is certified that error appears in the above-identified patent and that said Letters Patent is hereby corrected as shown below:

On the Title Page

Item [30], insert:
-- Foreign Application Priority Data
Nov. 3, 2021 (KR) .......................... 10-2021-0150073 --

Signed and Sealed this
Fourth Day of February, 2025

Coke Morgan Stewart
*Acting Director of the United States Patent and Trademark Office*